(12) United States Patent
Massoud

(10) Patent No.: US 7,233,653 B2
(45) Date of Patent: Jun. 19, 2007

(54) METHOD AND INSTALLATION FOR TELEPHONE INQUIRY

(76) Inventor: Nadim Massoud, POB 2059 Elviria, E-29600 Marbella (ES)

( * ) Notice: Subject to any disclaimer, the term of this patent is extended or adjusted under 35 U.S.C. 154(b) by 273 days.

(21) Appl. No.: 10/344,237

(22) PCT Filed: Aug. 10, 2001

(86) PCT No.: PCT/FR01/02594

§ 371 (c)(1), (2), (4) Date: Jul. 14, 2003

(87) PCT Pub. No.: WO02/15545

PCT Pub. Date: Feb. 21, 2002

(65) Prior Publication Data

US 2004/0013256 A1 Jan. 22, 2004

(30) Foreign Application Priority Data

Aug. 11, 2000 (FR) .................................. 00 10558

(51) Int. Cl.
*H04M 3/42* (2006.01)
(52) U.S. Cl. ............................ 379/207.09; 379/207.16; 379/218.01
(58) Field of Classification Search ............. 379/93.12, 379/207.08, 207.09, 210.01, 218.01, 207.16
See application file for complete search history.

(56) References Cited

U.S. PATENT DOCUMENTS 5,784,438 A * 7/1998 Martinez .................... 379/67.1
6,418,217 B1 * 7/2002 Ukon ..................... 379/210.01
6,493,443 B1 * 12/2002 Furman et al. ......... 379/210.01
6,574,324 B1 * 6/2003 Malik ..................... 379/210.01
6,804,342 B1 * 10/2004 Gadant ................... 379/210.01

FOREIGN PATENT DOCUMENTS

WO    WO 98/48562    10/1998

OTHER PUBLICATIONS

Newton's Telecom Dictionary, Sixth Edition, Aug. 1993, pp. 845 and 847.*
Patent Abstracts of Japan, vol. 16, No. 307 (E-1229), Jul. 7, 1992, & JP 04 086053 A (Matsushita Electric Ind Co Ltd), Mar. 18, 1992 abstract.

* cited by examiner

*Primary Examiner*—Bing Q. Bui
(74) *Attorney, Agent, or Firm*—Young & Thompson

(57) ABSTRACT

A method for querying by telephone a receiver centre (2) is characterised in that the querying party dials the telephone number of the receiver center (2) using a fixed or mobile apparatus (1) capable of receiving data (3,4,5,6,7), via a telephone network or data transmission, allowing the called telephone bell to ring a specific number of times, the receiver centre (2) automatically identifies the call number of the querying party and the number of ringing signals and automatically transmits to that number a reply (3,4,5,6,7) audible or visible on the fixed or mobile apparatus (1), the reply corresponding to the number of specific ringing signals. The invention is applicable to queries by telephone.

11 Claims, 1 Drawing Sheet

METHOD AND INSTALLATION FOR TELEPHONE INQUIRY

BACKGROUND OF THE INVENTION

The present invention concerns the general field of telephone inquiries, for example for checking show times (movies, theaters, etc.), timetables (airline, train, etc.), pricelists and the like, and optionally for placing orders or making reservations.

DESCRIPTION OF THE RELATED ART

Conventional telephone inquiries are time-consuming, tedious and costly, and, moreover, permit placing orders only by a process of communicating codes, for example those of credit cards, which may pose risks for the user. They are furthermore generally limited to fixed hours of operation, which may be inconvenient.

Responding to telephone inquiries by way of a recorded message does not overcome the disadvantages described above, as this merely replaces the cost of a person for responding, with a message distribution center that can be consulted at any time.

SUMMARY OF THE INVENTION

The rapid development of communication techniques makes it necessary to be able to provide telephone inquiry systems and optionally systems for placing orders that are instantaneous, free, and very simple to use as well as convenient for making inquiries.

The present invention seeks to provide such a system.

To that end, according to a first aspect of the invention, it has as an object a method for telephonic querying of a receiving center, characterized in that the user dials the telephone number of the said receiving center via a fixed or mobile apparatus capable of receiving data, through a telephone network or by data transmission, he then allows the dialed telephone to ring a predetermined number of times, the receiving center automatically identifies the number of the phone from which the user dialed and the number of rings, and automatically transmits to that number an audible or visual response on the said fixed or movable apparatus, the said respond corresponding to the predetermined number of rings.

The process according to the invention provides the possibility of automatically and almost instantaneously responding to an inquiry, without any cost for the user, regardless of whether the telephone number called is free or charge-based, since the telephone call is not answered and thus no communication is established.

According to one embodiment of the method according to the invention, the response transmitted by the receiving center contains at least one telephone number for making reservations and/or placing an order, the user dials this telephone number and permits the telephone he called to ring a predetermined number of times corresponding to an order, the receiving center, which may be the same or different, identifies the telephone number from which the call is placed and the number of rings, calls the telephone number from which the call is placed and automatically transmits to it an order confirmation in audible or visual form.

The invention also has as an object, according to a second aspect, an installation for practicing the above-described process.

BRIEF DESCRIPTION OF THE DRAWINGS

The invention will be better understood from reading the following description of an embodiment, with reference to the accompanying drawing, in which.

DESCRIPTION OF THE PREFERRED EMBODIMENTS

Figure 1:
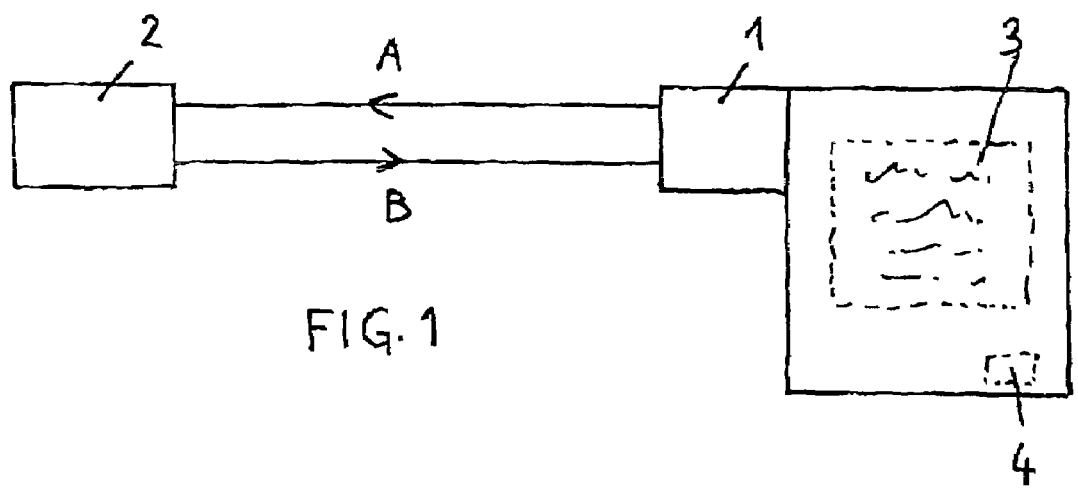
FIGS. 1 and 2 are schematic diagrams illustrating a process of the invention.

The user or client has available to it a terminal, for example a fixed or mobile apparatus 1, such as a fixed or mobile telephone, adapted to receive data via a telephone network or data transmission. He has a list of movie theaters, to each of which is assigned a respective free or charge-based telephone number in a given country.

The user dials the number assigned to the theater that he has chosen (call A) and permits the telephone to ring once, for example if he desires to hear the program in French, or twice if he desires to receive the program in English, etc., then he hangs up. This call is therefore free, regardless of whether the telephone called is free or charge-based, and regardless of whether the number dialed corresponds to a local, national or foreign center.

The dialed receiving center 2 is equipped so as to recognize the number of the telephone from which the call is placed, and the number of rings emitted, and to automatically transmit to this number from which the initial call is placed (call B), after reception of the initial call, via the telephone network or another data transmission network, data corresponding to the telephone number dialed by the user and to the number of rings.

In the example described, the user receives at his apparatus, in the form of one or several text, image or voice messages 3, the programs and timetables of the selected theater.

According to another embodiment of the invention, adapted for placing an order, in case of reserving cinema tickets, the display program 3 is accompanied by a telephone number 4.

This overall procedure is illustrated by the block diagram of FIG. 1.

The user may thus call (call C) the receiving center 2 on the telephone number 4 corresponding to the selected program and show time. He permits the telephone to ring once, for example to reserve one seat, or twice, for example to reserve two seats, etc., and hangs up. As before, his call is free.

The receiving center 2 thus automatically calls (call D) the number from which the initial call is placed, and transmits to it a confirmation message 5 containing in particular a code number 6. The presentation of this code number at the entrance of the theater permits the user to access the establishment for the number of seats ordered.

Figure 2:
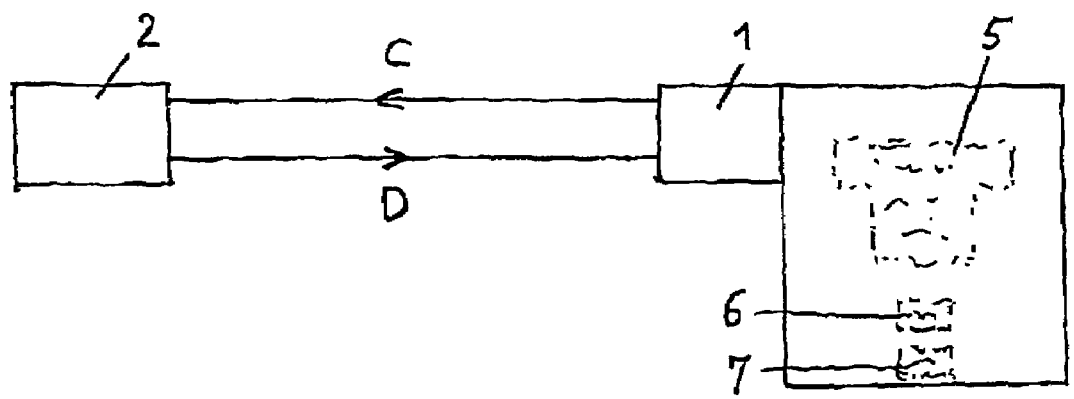

This receiving center 2 in FIG. 2 is identical to the receiving center 2 called in FIG. 1, but it could also be a different receiving center, the user calling a first receiving center which transmits data to the user such as the telephone number of a second different receiving center which handles reservations.

For payment, the client has for example subscribed to a payment service, in which his telephone number identifies him, such that the receiving center 2', which may be automatically connected to the payment service center, is automatically credited with payment for the reserved seats, this payment being automatically debited from the account of the client, without any risk of revealing a code number. Thus, after the user has placed the order, the receiving center 2 thus automatically issues a debit signal to a payment service center in which the user is enrolled, and the said payment service center debits the account of the user for the amount corresponding to the order and credits the receiving center 2. These automatic transactions may be secured in a simple manner by permitting the transaction and/or the payment service center to be connected only to the receiving centers, such as the receiving center 2, identified and enrolled in the payment service.

In addition, the system may be equipped to cancel orders. In this case, the order confirmation message 5 also comprises a cancellation telephone number 7. The client may call this number within a predetermined time interval, for example up to 30 minutes before show time. By permitting the telephone to ring a predetermined number of times, for example only once, and hanging up, this allows the receiving center 2 to automatically issue a cancellation message and to cancel the payment by the payment service.

It will be understood that the method and installation that have just been described are illustrated only by way of example with respect to theater show times, and it will be understood that they may be applied to numerous applications for inquiries and sales.

The invention claimed is:

1. Process for telephonic inquiry of a receiving center (2), in which a user dials a telephone number of the receiving center (2) by means of a fixed or mobile apparatus (1) capable of receiving data (3, 4, 5, 6, 7), through a telephone network or data transmission, permits a called telephone associated with the receiving center to ring a predetermined number of rings, the receiving center (2) automatically identifies the user's telephone number and the number of rings before the user hangs up, characterized in that the receiving center (2) automatically calls the user's telephone number and transmits an audible or visual response (3, 4, 5, 6, 7) on the fixed or mobile apparatus (1), said response corresponding to the predetermined number of rings.

2. Process according to claim 1, characterized in that the response (3, 4) transmitted by the receiving center (2) contains at least one telephone number (4) for reservation and/or order placement, the user dials this telephone number and permits the dialed telephone to ring a predetermined number of times corresponding to an order, the same or a different receiving center (2) identifies the calling telephone number and the number of rings, calls the telephone number from which the call is placed and transmits to it automatically an order confirmation (5) in audible or visual form.

3. Process according to claim 2, characterized in that, after the user has placed an order, the receiving center (2) automatically issues a debit signal to a payment service center in which the user is enrolled and the payment service center debits the account of the user by an amount corresponding to the order and credits said amount to the receiving center (2), communication between the receiving center (2) and the payment service center being preferably secured.

4. Process according to claim 2, characterized in that the order confirmation (5) also comprises a cancellation telephone number (7) and that, when the user calls said cancellation telephone number (7) within a predetermined time period and permits the phone to ring a predetermined number of times and then hangs up, the receiving center (2) automatically cancels the order and issues a cancellation message to the location of the user.

5. Process according to claim 3, characterized in that the order confirmation (5) also comprises a cancellation telephone number (7) and that, when the user calls said cancellation telephone number (7) within a predetermined time period and permits the phone to ring a predetermined number of times and then hangs up, the receiving center (2) automatically cancels the order and issues a cancellation message to the location of the user.

6. Installation for querying and/or issuing orders and paying for said orders, comprising a fixed or mobile apparatus (1) adapted to receive data (3, 4, 5, 6, 7) via a telephone network or data transmission and comprising telephone call placing means, as well as a receiving center (2) adapted to recognize telephone calls placed by said apparatus (1) to a telephone number of said receiving center (2), and to identify the telephone number of a caller and a number of rings that occur before the caller interrupts his call, characterized in that said receiving center (2) comprises means for automatically calling said apparatus (1) and for transmitting data (3, 4, 5, 6, 7) in the form of an audible or visual response on the apparatus, said response corresponding to the number of rings recognized.

7. Process for telephonic inquiry of a receiving center (2), comprising the steps of:

a user calling a telephone number of a receiving center (2) and hanging up;

the receiving center (2) automatically identifying the user's telephone number and a number of rings before the user hangs up; and the receiving center (2) automatically calling the user's telephone number and transmitting one of plural audible or visual responses, the one response corresponding to a predetermined number of rings, wherein, the number of rings before the user hanging up equaling a first number of rings corresponds to a first message response being transmitted to the user's telephone number and the number of rings before the user hanging up equals to a second number of rings corresponds to a second message response being transmitted to the user's telephone.

8. Process according to claim 7, wherein, the first message response transmitted by the receiving center contains at least one telephone number for reservation and/or order placement, the user dials this telephone number and permits the dialed telephone to ring a predetermined number of times corresponding to an order, the same or a different receiving center (2) identifies the calling telephone number and the number of rings, calls the telephone number from which the call is placed and transmits to it automatically an order confirmation (5) in audible or visual form.

9. Process according to claim 8, wherein, after the user has placed an order, the receiving center (2) automatically issues a debit signal to a payment service center in which the user is enrolled and the payment service center debits the account of the user by an amount corresponding to the order and credits said amount to the receiving center (2).

10. Process according to claim 8, wherein, the order confirmation (5) also comprises a cancellation telephone number (7) and, upon the user calling said cancellation telephone number (7) within a predetermined time period and permits the phone to ring a predetermined number of times and then hangs up, the receiving center (2) automatically cancels the order and issues a cancellation message to the location of the user.

11. Process according to claim 9, wherein,
the order confirmation (5) also comprises a cancellation telephone number (7) and,
upon the user calls said cancellation telephone number (7) within a predetermined time period and permits the phone to ring a predetermined number of times and then hangs up, the receiving center (2) automatically cancels the order and issues a cancellation message to the location of the user.

* * * * *